Nov. 18, 1924.
T. L. FAWICK
1,515,850
TRANSMISSION
Filed May 14, 1924      4 Sheets-Sheet 4
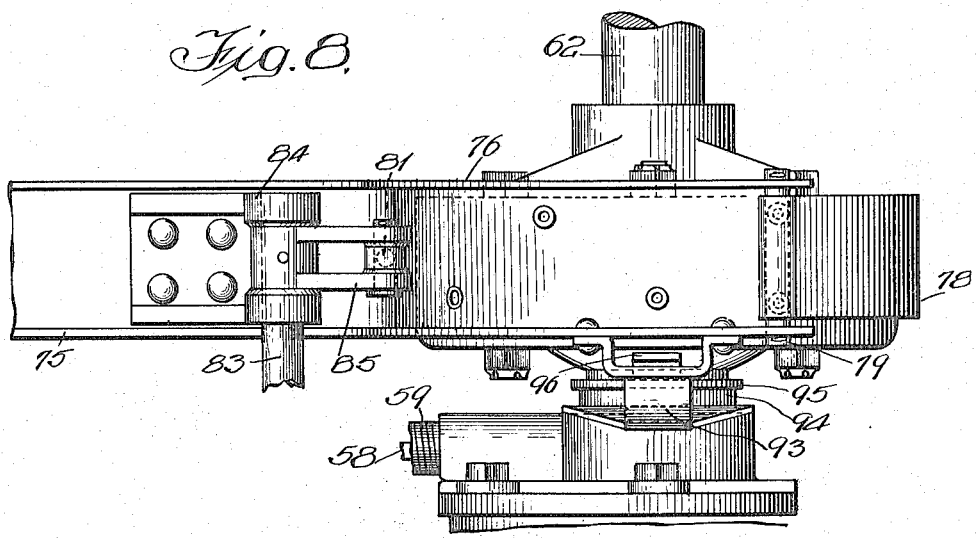
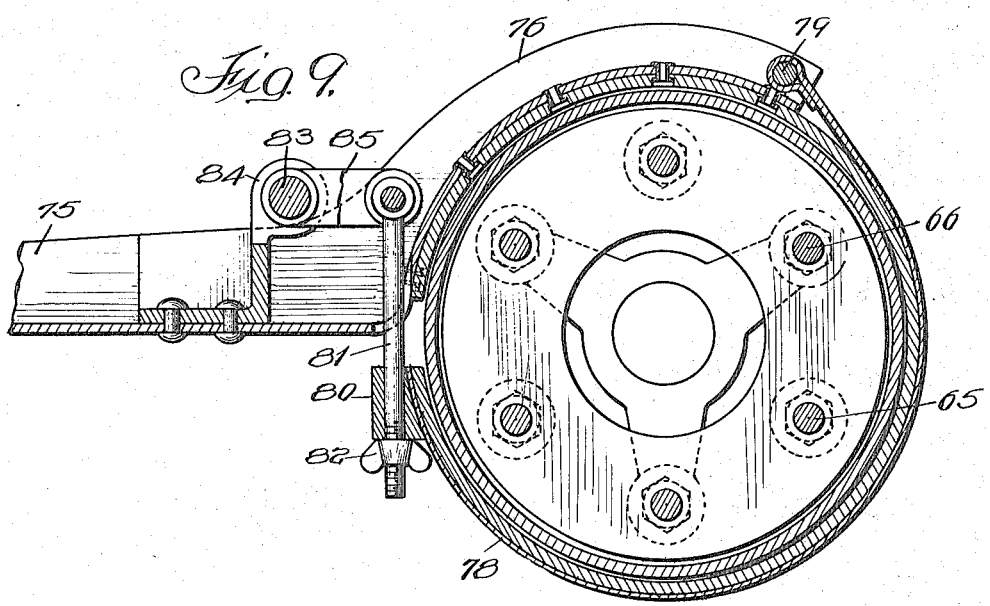

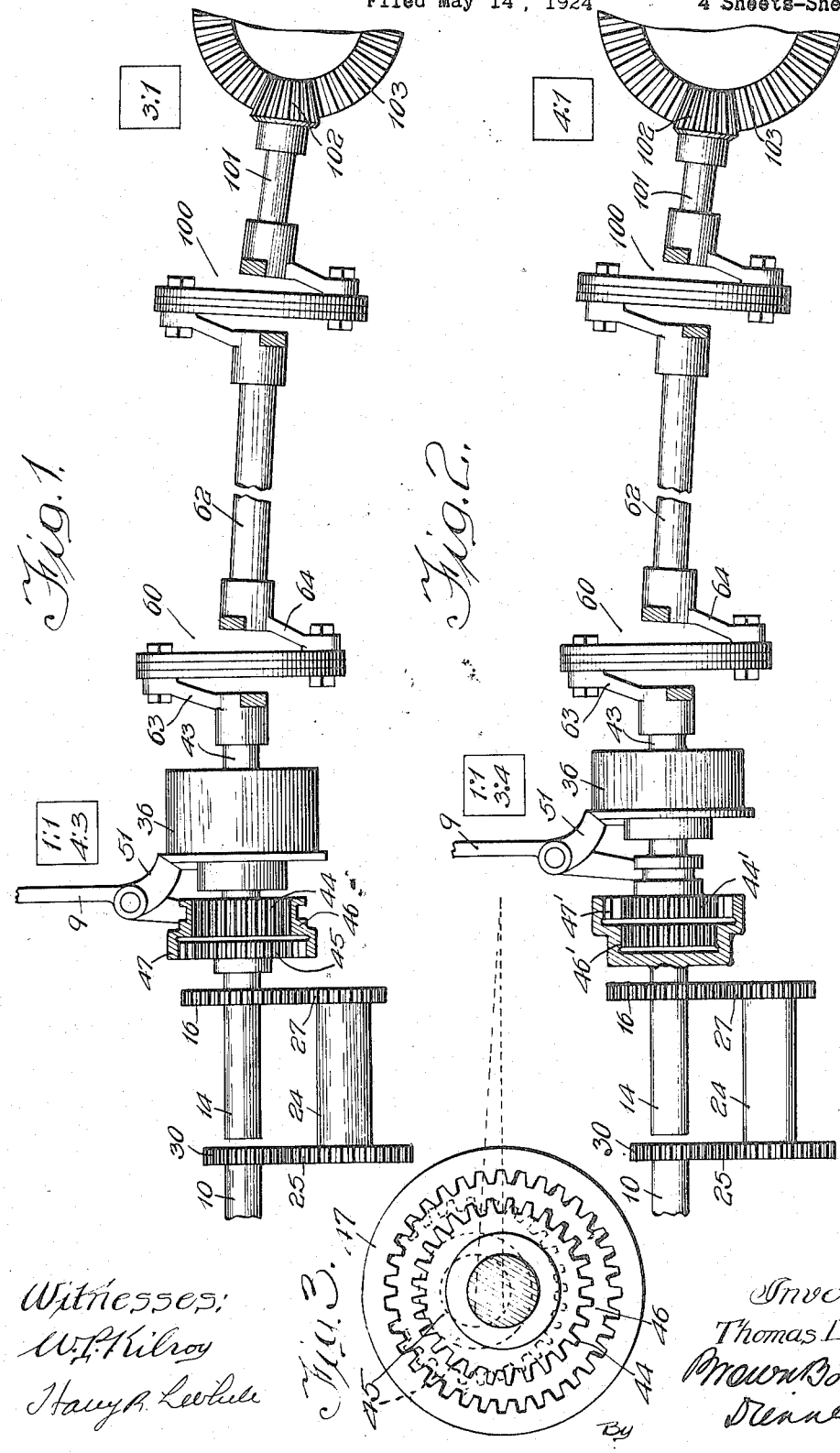

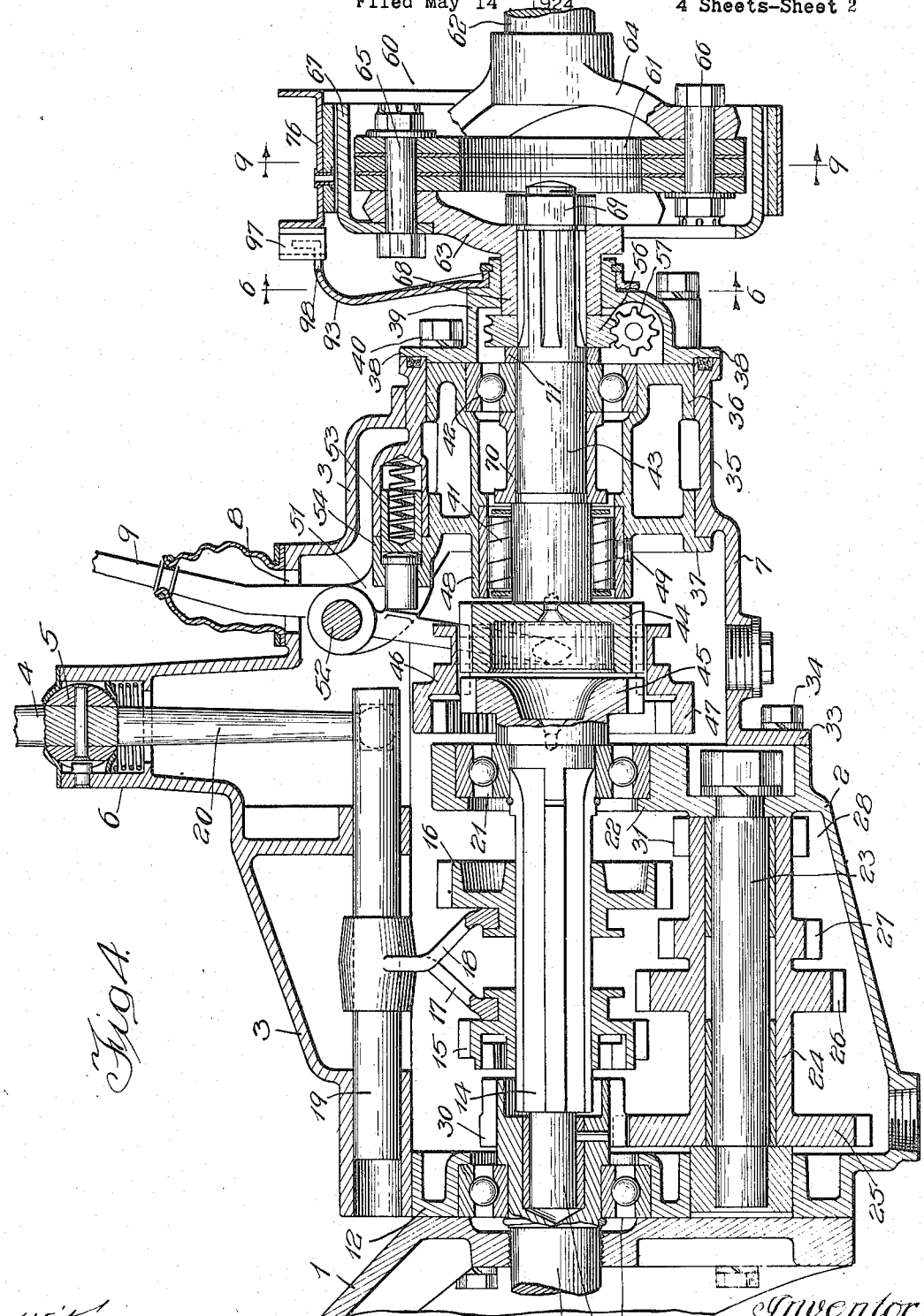

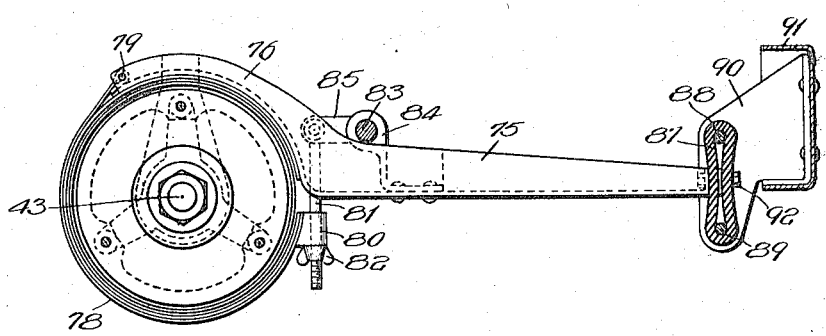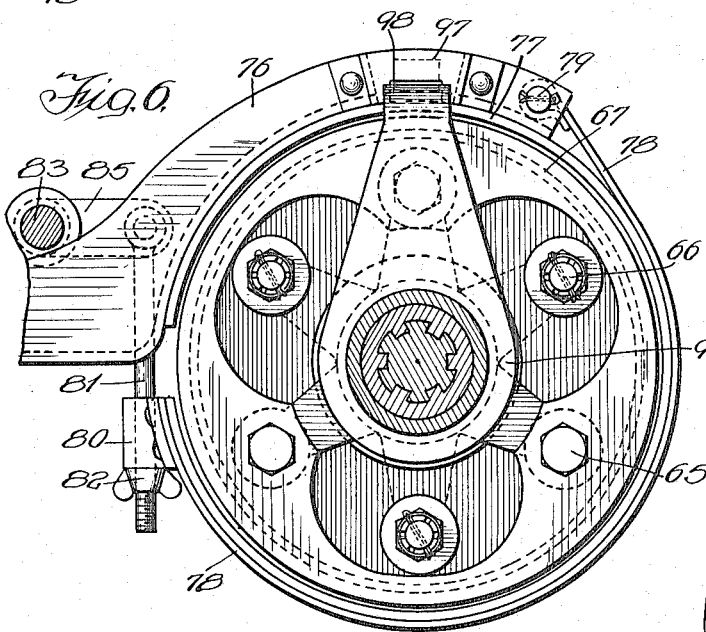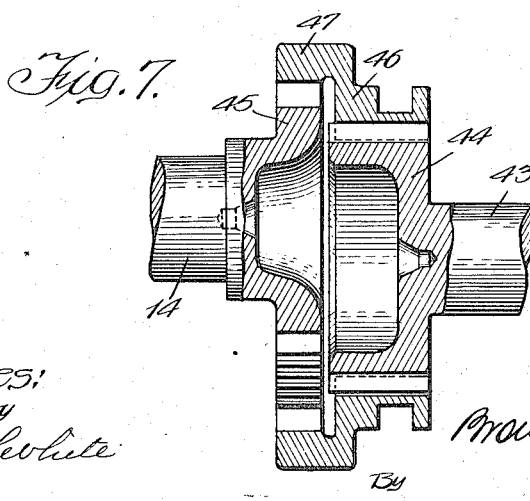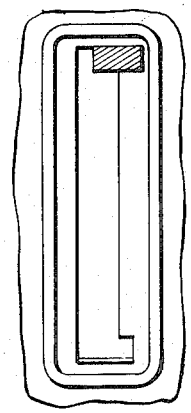

Patented Nov. 18, 1924.

1,515,850

UNITED STATES PATENT OFFICE.

THOMAS L. FAWICK, OF RACINE, WISCONSIN.

TRANSMISSION.

Application filed May 14, 1924. Serial No. 713,237.

*To all whom it may concern:*

Be it known that I, THOMAS L. FAWICK, a citizen of the United States, residing at Racine, in the county of Racine and State of Wisconsin, have invented a certain new and useful Improvement in Transmissions, of which the following is a full, clear, concise, and exact description, reference being had to the accompanying drawings, forming a part of this specification.

This invention relates to transmissions for automobiles, trucks and the like.

Whereas in my prior application, Serial No. 671,317, of October 29, 1923, I have disclosed and claimed a compound transmission of the present class, combining with the regular or standard accelerating and reverse transmission a speed range transmission characterized by the use of a spur pinion and an internal gear with a clutch socket, the present application discloses and claims an improved construction of the internal gear and clutch element to the end of minimizing the distance between the bearings of the shaft which are connected by the aforesaid special gears; an improved transmission brake construction and an improved speedometer drive all for use in a transmission of the aforementioned type.

In order to acquaint those skilled in the art with the manner of constructing and operating a device embodying my invention, I shall now described, in connection with the accompanying drawings, a specific embodiment in which my invention appears.

In the accompanying drawings:

Figs. 1 and 2 are diagrams indicating the mode of use of my invention for stepping down or stepping up the speed of the rear axle with respect to the engine speed;

Fig. 3 is a diagram illustrating the manner of shifting the gears of my invention with respect to each other so as to secure movement in substantially a vertical plane;

Fig. 4 is a vertical longitudinal section through a transmission employing my invention;

Fig. 5 is an end view taken from the right of Fig. 4 showing the torque arm of the brake and the mode of mounting it upon the frame to take the torque reaction of the brake;

Fig. 6 is a section through the rear end of the transmission taken on the line 6—6 of Fig. 4;

Fig. 7 is an enlarged detail view showing the construction of the shiftable gear and clutch member;

Fig. 8 is a plan view of the rear end of the transmission showing the top of the brake construction and the speedometer connection;

Fig. 9 is a vertical transverse section through the brake and flexible coupling taken on the line 9—9 of Fig. 4; and Fig. 10 is a developed top plan view of the gate in which the controlling handle moves.

Referring now to Fig. 4, the clutch and fly-wheel housing 1 of the engine forms a mounting for the gear case 2, which, in the present case, has a removable top 3 mounting a gear shift lever 4. This gear shift lever has a universal joint mounting 5 in a hollow boss 6 formed integral with the cover 3. To the rear end of the gear case 2, there is secured the supplement gear case section 7, which is covered by the rear part of the cover or top 3. This rear part of the cover or top 3 is provided with a suitable slot 8 in which there is movably mounted a control handle 9. The driving shaft 10 coming from the clutch and through the clutch from the motor is mounted in bearings 11 in the rear wall 12 of the gear case 2. The rear end of the driving shaft 10 is recessed to provide a bearing for the reduced portion 13 of the stub shaft 14. This stub shaft is suitably splined to receive the sliding gear and clutch member 15 and the sliding gear member 16. These members 15 and 16 are thus rigidly connected by the splines in the shaft 14 and are adapted to be shifted axially by means of suitable yokes or forks 17 and 18 respectively, these yokes or forks engaging suitable collars of the gear members 15 and 16 and being mounted upon sliding rod 19 mounted in the cover 3 and engageable by the lower end 20 of the gear shift lever 4. The rear end of the stub shaft 14 is mounted in suitable anti-friction bearings 21 mounted in the rear wall 22 of the gear case section 2. A relatively stationary countershaft 23 is mounted below and parallel to the stub shaft 14 and an integral collar and gear member 24 is mounted upon said shaft 23. The ends of the stationary shaft 23 are seated in the front and rear walls 12 and 22 of the gear case section 2, respectively. Upon the lay or countershaft 23, suitable gears 25, 26, 27 and 28 are integrally connected by a collar 24. A combined pinion and clutch member 30 is fixedly mounted on the end of the drive shaft 10, and its gear teeth are in constant mesh with the gear wheel 25. The gear and clutch members 30 and 15 have engageable clutch teeth for clutching shafts 10 and 14 directly together for drive straight through the gear box. The gear member 15 is also shiftable to engage its teeth with the teeth of the gear wheel 26, thereby securing a second speed. The shiftable gear 16 is adapted to be shifted to engage its teeth with the teeth of the wheel 27 for a suitable first speed, and the gear wheel 16 is also shiftable to engage its teeth with the teeth of the idler pinion 31, which, in turn, mesh with the teeth of the gear wheel 28 for reverse drive. The particular construction of the gears, shafts and shifter forks and rods in the gear case section 2 is not of the essence of the invention. Furthermore, the cover 3, instead of mounting the manual shifter rod 4, may mount any desired form of shifter mechanism, such, for example, as electric gear shifting mechanism.

The casing section 7 is bolted to the section 2 as by means of the flange 33 and screws 34.

The rear part of the casing section 7 is made cylindrical, as indicated at 35, and the inside of this cylindrical portion is machined out to form a seat for the drum or carriage 36. This drum or carriage 36 is freely rotatable within the cylindrical casing portion 35, but it is restrained from axial movement by a flange 37 at the front end and the flange 38 of rear cover plate 39, which is bolted by the cap screws 40 to the rear end of said drum 36. The drum 36 provides roller bearings 41 at the front end and suitable anti-friction bearings 42 at the rear end for mounting the shaft section 43.

It is to be noted that the shaft section 43 carries a pinion 44 at its front end and the stub shaft 14 carries a driving pinion 45 at its rear end, these two pinions being of the same effective diameter so that the sliding clutch collar 46, which has splines closely fitting the teeth of the pinion 44, may be moved axially to the left, as viewed in Fig. 4, for clutching the teeth of the driving pinion 45. The splines of the clutch 46 and of the pinion 44 need not be full gear teeth, since their sole function is that of clutching the two parts together. The clutch member 46 bears an internal gear member 47 having teeth adapted to mesh with the teeth of the driving pinion 45, as will be explained more in detail later. It will be observed that the front end of the drum or carriage 36 has a forwardly extending flange 48 for mounting the outer race of the bearings 41. This race is held in place by a suitable pin or grub screw 49. The clutch pinion 44 is of a diameter in excess of the diameter of the forward extending flange 48, so that the clutch collar 46 may be shifted to the rear to a position overhanging said flange 48 to bring the front edge of the internal gear 47 clear of the rearmost edge of the driving pinion 45 so that lateral shifting of the clutch and internal gear member 46 and 47 may be made without touching any part of the pinion 45.

The drum or swinging carriage 36, while it is cylindrical, is mounted with its axis eccentric of the axis of the shaft section 43, so that rotation of said drum 36 causes shifting of the shaft section 43 in positions parallel to itself, as will be understood from the diagram of Fig. 3. In Fig. 3, I have indicated diagrammatically the internal gear 47 meshing with the pinion 45 and showing the location of the clutch pinion 44, which is concentric with the internal gear 47, as being immediately below the pinion 45. By the shifting of the eccentric drum or carriage 36, it will be apparent that the axis of the pinion 44 may be brought up vertically into line with the axis of the driving pinion 45, so that the clutch portion 46 may be axially telescoped over the driving pinion 45. It will be seen that the shifting of centers may be accomplished by a substantially vertical movement, although the true movement is a circular movement and the positions selected are those which are substantially in line vertically.

The eccentric drum or carriage 36 has a pair of forwardly extending lugs 51, between which is mounted the pivot 52 of the lever 9, consisting in this case of a pin. The lower arm of the control lever 9 comprises a shifter fork lying in a groove of the clutch collar 46. A spring pressed locking pin 53 is adapted to enter a socket 54 in the flange of the drum member 36 in the position of the parts shown where the pinions 44 and 45 are axially in line, and a similar pin (not shown) is provided when the socket 54 is in position corresponding to meshing of internal gear 47 with the pinion 45, as shown in the lower position of diagram Fig. 3. A pin 55 is provided for forcing the locking pins 53 out of the socket 54 to unlock the drum or carriage after the clutch and internal gear member 46—47 has been thrown to the right, as viewed in Fig. 4, far enough to clear the pinion 45. The control lever 9 is adapted to be pushed forward to move the clutch and gear member 46—47 to the right, as viewed in Fig. 4; then the lever 49 is moved sidewise to swing the eccentric drum 36 in its cylindrical mounting angularly, whereupon the lever 9 is pulled to the rear. The first pivotal motion moves the clutch and gear member axially out of engagement or possible engagement with the pinion 45. The angular motion then shifts the axis of the shaft section 43 and the final swinging motion of the lever 9 shifts the clutch and internal gear member 46—47 to mesh one of the sets of teeth thereof with the teeth of the pinion 45.

The rear cover plate 39 forms a housing for the worm wheel 56, which worm wheel is splined upon the rear end of the shaft section 43. A cooperating worm wheel 57 is mounted in the housing 39 and is connected to a flexible shaft 58 for driving the speedometer. The flexible shaft 58 has a flexible housing or armor 59 which is secured to the housing 39. A universal joint 60, employing fabric plates or rings 61, is connected between the shaft section 43 and the shaft section 62, forming a part of the propeller shaft for driving the rear axle. The fabric rings 61 are clamped to spider members 63 and 64 by suitable clamping bolts 65 and 66. A pressed sheet metal brake drum 67 is mounted upon the ends of the spider arms 63, being clamped thereto by the bolts 65, said drum having an inturned flange seating against the spider arms 63 and held by the bolts 65. The inner spider 63 has a hub member 68 which is splined to fit upon the splines on the rear end of the shaft section 43 and to be held in place by the nut 69. The assembly of the bearings and other parts on the shaft section 43 is interesting. The inner race of the front bearing 41 may be formed integral with the shaft 43, or it may consist of a collar which fits over the shaft section 43 and is held in place by the casing collar 70, which, in turn, engages the inner race of the bearings 42. A short spacing collar is then introduced to fill in the space between the inner race of the bearings 42 and the worm wheel 56. This spacing collar 71 may, if desired, be threaded upon the shaft section 43 to hold the inner race of the bearings 42 in place. The nut 69 pushes the hub of the spider member 63 against the worm wheel 56 and, in turn, against the spacing collar 71, which bears upon the inner race of the bearing 42, and this, in turn, rests either against an integral shoulder on the shaft section 43 or against the bearing race for the inner bearing 41.

The flexible joint 60 is, with the exception of the brake drum, of the usual or any preferred construction, employing the flexibility of the fabric rings 61 for securing freedom to take up the play occasioned by the propeller shaft section 62 being out of line with the propeller shaft section 43.

A brake arm 75 having a curved shoe portion 76 bears upon the brake drum through the intermediate brake lining 77, which lining embraces substantially the entire circumference of the brake drum 67, being held by thin metal strap 78 which is pinned, as indicated at 79, to the shoe 76 and continues around the periphery of the brake drum to a lug member 80 which is adapted to receive the tightening rod 81 having the adjustable nut 82 upon the lower end thereof. An operating shaft 83 is pivoted upon a bracket 84 mounted on the brake arm 75 and this operating shaft 83 is adapted to swing the short arm 85 upwardly, as viewed in Fig. 5, to tighten the brake band 78 and thereby grip the brake drum, serving as a transmission brake. The shaft 83 may be operated through universal joints or in any other well known manner, either by a hand lever or a foot pedal, both of which are well known and form no part of the present invention.

If desired, the brake band and shoe 78—76 may be applied through a suitable cross shaft lying above the shaft section 43 and transverse thereto.

The outer end of the brake arm 76 is anchored through a shackle mounting comprising a closed loop of fabric 87 suspended on pins 88 and 89, which, in turn, are mounted upon a pair of bracket arms 90 or upon a single bracket arm, which, in turn, is secured to the frame or side panel member 91 which forms a sill of the car, or to any other suitable point.

The bracket 90 is made of sheet metal and the arm which holds the bolts 88—89 lies in a vertical plane transverse to the vehicle presenting relatively great strength to vertical motion of the end of the arm 75. The end of this arm 76 is anchored by suitable bolt 92 to the central part of the fabric loop 87. It will be apparent that the end of the arm 75 cannot move up or down because of this anchorage, but the end bearing the brake shoe 76 may move up or down pivoting about the anchorage in the fabric shackle 87. The brake shoe 76 is prevented from moving laterally off of the brake drum 67 by a sheet metal bracket arm 93 which has a hub portion 94 fitting over the hub or central portion of the housing 39 and held in place by a snap ring 95. The hub 94 is thus free to turn upon the hub of the housing 39, but prevents lateral displacement of the brake shoe 76 and consequently of the brake band 78. The upper end of the bracket arm 93 has a finger 96 held in place in a strap 97 by a notch 98, which interlocks with the shoulder where the finger 96 joins the main part of the bracket 93 so as to limit play between the strap and the finger to a minimum.

It will now be apparent that the shaft section 43 may move up or down, as viewed in Figs. 4 and 5, without disturbing the alignment of the parts and without disturbing the anchorage of the brake arm 75 on the flexible shackle 87. It will be apparent that a vertical rigid link between the end of the arm 75 and one of the bolts or pins 88 or 89 might be employed instead, but this would have to be lubricated and would sooner or later introduce play, which is undesirable. In addition, the fabric shackle 87 permits of a twisting for proper adjustment of the brake shoe and brake band upon the drum without introducing any difficulty.

The brake arm 76 may be connected to the gear housing section 7, if desired, to take up the torque reaction of braking. It is not desirable to take the torque reaction upon the eccentric arm 36, since it is not adapted for taking up this stress.

Referring now to the diagrams of Figs. 1 and 2, I have indicated in each diagram; first, the usual or preferred change-speed mechanism; next, the internal-external gear combination having the shaft section 43 adapted to be translated laterally for meshing either with the clutch socket or with the internal gear, then the flexible joint 60, then an intermediate shaft section 62; next, a flexible joint 100, a final shaft section 101 leading to the driving pinion 102 and thence to the ring gear 103 of the differential of the rear axle.

In Fig. 1, I have shown a gear reduction in the rear axle of three turns of the propeller shaft to one turn of the rear wheels. The external-internal gear combination 44—47 permits of either a direct drive; that is, one to one, or of a further reduction of four turns of the stub shaft 14 to three turns of the propeller shaft. This makes available, on direct drive through the pinion 45, clutch 46 and pinion 44, a ratio of three turns of the engine shaft to one turn of the rear wheels, or, upon meshing the gears 45 and 57, four turns of the engine shaft to one turn of the rear wheels. Such a gear arrangement permits of normal drive at a high ratio and a selective drive through the gears at a higher ratio.

In the diagram of Fig. 2, I have shown the rear axle ratio as four turns of the propeller shaft to one turn of the rear wheels and the selective ratios as the internal-external gear combination 44'—47' as either one to one on direct drive or three turns of the engine shaft to four turns of the propeller shaft on meshing the gears. The result is a driving ratio between the engine shaft and the rear wheels of either four turns of the engine shaft to one turn of the rear wheels or three turns of the engine shaft to one turn of the rear wheels. Where most of the drive is at relatively low speeds, as is the case with the average car used in the city or with trucks under load, the form shown in Fig. 2 is desirable. It will be appreciated that the sliding internal gear and clutch structure, as shown in Fig. 1, may be employed in reverse form in the scheme of Fig. 2. The shifting of the swinging carriage or drum 36 to change the relative position of the shaft sections 14 and 43 with respect to each other does not interfere with the proper operation of the transmission brake above described, nor does it interfere with the proper operation of the speedometer drive, since the flexible shaft permits the speedometer to take its drive from any position of the drum and shaft section 43, these two parts moving together.

I do not intend to be limited to the details shown or described.

I claim:

1. In a change-speed transmission employing a driven shaft section movable into a position parallel with its first position, a movable carriage for said shaft section, a frame mounting said carriage, a brake drum secured to said shaft section, a brake for said drum and means rigid with said frame for taking up the torque reaction of the brake.

2. In combination, a driving shaft, a driven shaft section, a movable carriage having bearings for supporting said shaft section, means for moving said carriage to shift the shaft by motion of translation parallel to itself, a brake drum secured to said shaft, a brake member cooperating with said drum and means independent of said carriage for taking up the torque reaction of the brake.

3. In a transmission, the combination of a driving shaft, a driven shaft, bearings for said shafts, a swinging carriage for one of said shafts, said carriage mounting the bearings for said one shaft, pinions of the same pitch and diameter for adjacent ends of the said shafts, a combined clutch and internal gear member having two sets of internal teeth, one set of the same diameter as the pinions and the other of a larger diameter, both sets being of the same pitch as the pitch of the pinions, said member being mounted permanently on one of the pinions and being movable axially for engaging the other pinion to clutch the two shafts together or for meshing the set of teeth of larger diameter with the pinion on the other shaft when the two shafts are offset with respect to each other.

4. In a transmission, the combination of a driving shaft, a driven shaft, bearings for said shafts, a swinging carriage for one of said shafts, said carriage mounting the bearings for said one shaft, pinions of the same pitch and diameter for adjacent ends of the said shafts, a combined clutch and internal gear member having two sets of internal teeth, one set of the same diameter as the pinions and the other of a larger diameter, both sets being of the same pitch as the pitch of the pinions, said member being mounted permanently on one of the pinions and being movable axially for engaging the other pinion to clutch the two shafts together or for meshing the set of teeth of larger diameter with the pinion on the other shaft when the two shafts are offset with respect to each other, and means for moving the carriage to bring the shafts into axial alignment for clutching together for one to one driving ratio or into offset relation for meshing of the cooperating pinion and internal gear for producing a different driving ratio.

5. In combination, a shaft having a pinion, a second shaft having a pinion of the same diameter and pitch, a combined internal gear and clutch member having teeth for permanently engaging one pinion and selectively engaging the other pinion for clutching the shafts together for direct drive and having another set of teeth of greater effective pitch diameter for engaging the other pinion to provide a driving ratio.

6. In combination, a relatively stationary driving shaft, a relatively movable driven shaft adapted to have a motion of translation, pinions on the adjacent ends of said shafts, a combined clutch and internal gear member permanently meshing with one of said pinions and selectively meshing with the other pinion for direct drive or for a gear reduction, an eccentric supporting said driven shaft, said eccentric having a hub of less diameter than the pinions and having a bearing for the shaft inside of said hub.

7. In combination, a shaft having clutch head bearing splines, a cooperating spline clutch member slidably mounted on said head, an eccentric member for mounting said shaft, said eccentric member having an axially extending hub substantially concentric with the shaft, said hub being of a diameter smaller than the internal diameter of said clutch member to permit the clutch member to overhang the hub, and a bearing for the shaft in said hub.

8. In combination, a relatively stationary shaft, a cooperating laterally movable shaft, an eccentric drum supporting said movable shaft, said drum having an axially extending hub, a bearing in the hub for the shaft, pinion members on the adjacent ends of said shaft, a combined clutch and internal gear mounted on one of said pinions, said combined clutch and internal gear member being adapted to overhang said axially extending hub.

9. In combination, a gear casing having an eccentric, a shaft section mounted in the eccentric, means to move the eccentric and the shaft section, an end plate for the eccentric closing the end of the gear case, said end plate having a central hub about the shaft section, a flexible joint having one member thereof connected to the shaft section, a brake drum connected to said one member, a cooperating brake shoe for said brake drum and a retaining bracket mounted on said concentric hub and connected to the brake shoe.

10. In combination, a gear casing, a swinging carriage in said gear casing, a shaft section mounted in said swinging carriage, an end plate for the swinging carriage closing the end of the gear casing, means for moving the swinging carriage in said gear casing, said end plate having a concentric hub, a spider for universal bearing mounted on the end of the shaft section, a drum mounted on said spider, a brake shoe for engaging the drum, a bracket arm having a circular portion fitting over said concentric hub and means for retaining said cylindrical portion on said hub.

11. A gear housing having a central hub, a shaft projecting through said hub, a spider having a plurality of arms, said spider having a hub member mounted on the end of said shaft, a brake drum mounted on the spider arms, a brake shoe for cooperating with the drum, a sheet metal loop secured to said shoe, a notch in the side walls of the loop, a retaining bracket having a finger entering said loop through the notch, said bracket being mounted on the hub and being free to have rotary motion on the hub means for restraining axial motion of said bracket member on said hub and means for angularly turning said hub.

12. In combination, a transmission having a shaft section laterally shiftable in position, a brake drum connected to said shaft section, a pressed sheet metal brake shoe and arm having one portion thereof engaging the brake drum, a brake band cooperating with the shoe and means for tightening said band mounted on the brake arm, said brake arm being held by means rigid with the transmission.

13. In combination, a transmission having a laterally shiftable shaft section, a bearing member for said shaft section, a brake drum secured to said shaft section, a brake arm having a curved shoe overlying the upper part of the brake drum, means secured to the bearing for holding said brake shoe in position on the drum, a cooperating brake band connected to said shoe, means for tightening the band and means rigid with the transmission for pivotally holding the outer end of the brake arm.

14. In a transmission having a shaft section, means mounted at the rear of the transmission for raising and lowering said shaft section, a frame member connected to said transmission, a brake drum connected to the shaft section, a brake arm having a shoe extending over a portion of the periphery of the drum, a brake band cooperating with the shoe, means on the rear end of the transmission for holding the brake shoe and band in register with the drum, a bracket mounted on the frame and a looped fabric link between said bracket and the end of the brake arm.

15. In a transmission the combination of a driving shaft, a driven shaft, a swinging carriage for said driven shaft, pinions of the same pitch and diameter for adjacent ends of the said shaft, a combined clutch and internal gear member having two sets of internal teeth, one set of the same diameter as the pinions and the other of a larger diameter, both sets being of the same pitch as the pitch of the pinions, said member being mounted permanently on one of the pinions and being movable axially for engaging the other pinion to clutch the two shafts together or for meshing the set of teeth of larger diameter with the pinion on the other shaft when the two shafts are offset with respect to each other.

16. In combination, a pinion shaft having a pinion mounted on the end thereof, a shaft section beyond the pinion having splines of the same pitch and diameter as the teeth of the pinion and an axially shiftable clutch and internal gear member mounted on the shaft section and having splines fitting the splines of the shaft section and fitting the teeth of the pinion and means for shifting one of said shafts laterally with respect to the other.

17. In combination a driving pinion, a driven shaft having its adjacent end splined to match the teeth of the pinion, an internal gear having a sleeve provided with internal splines fitting on the splines of the shaft and adapted to be axially meshed with the teeth of the pinion, said internal gear and pinion being adapted to be meshed for a gear reduction or for a direct drive.

18. In combination, a driving pinion, a driven shaft having its adjacent ends splined to match the teeth of the pinion, an internal gear having a sleeve provided with internal splines fitting on the splines of the shaft and adapted to be axially meshed with the teeth of the pinion, said internal gear and pinion being adapted to be meshed for a gear reduction or for a direct drive, a carriage for supporting the driven shaft adapted to shift the same laterally and a shifter fork cooperating with the sleeve of the internal gear to shift said gear axially.

19. In combination, a driving shaft, a movable carriage, a shaft section mounted in said movable carriage, gears connecting said shaft and shaft section, said gears comprising a pinion and an internal gear, one of said gears being axially slidable on said shaft section, said movable carriage being mounted to swing the shaft section into concentric position for direct clutching with the driving shaft or into eccentric position to drive through the gears, said positions lying in substantially a vertical plane.

20. In combination a housing having a cylindrical bore, an outwardly extending shoulder at the front end of the bore, a cylindrical drum in said bore having an outwardly extending shoulder at its front end coacting with said first named shoulder, a cover plate for the rear end of the drum and housing, said cover plate being secured to the drum and having a flange engaging the end of the housing, a shaft mounted eccentrically in said drum and means for angularly moving the drum to move said shaft up and down.

21. In combination, a housing having a cylindrical bore, an outwardly extending shoulder at its front end, a cylindrical drum in said bore having an outwardly extending shoulder at its front end coacting with said first named shoulder, a cover plate secured on the end of the drum and coacting with the end of the housing, a shaft carried eccentrically of said drum and extending through said cover plate, said cover plate having a recess therein, a worm on the shaft in said recess and a worm gear journaled in said cover plate and projecting into said recess and means for swinging the drum axially in said housing to move the same up and down.

In witness whereof, I hereunto subscribe my name this 12th day of May, 1924.

THOMAS L. FAWICK.